United States Patent

[11] 3,586,148

[72] Inventors Allen G. Jacobson
Ramsey;
Theodore Schieber, Wayne, both of, N.J.
[21] Appl. No. 750,551
[22] Filed Aug. 6, 1968
[45] Patented June 22, 1971
[73] Assignee Computer Transceiver Systems Inc.
Upper Saddle River, N.J.

[54] KEYBOARD APPARATUS SWITCHABLE BETWEEN TELETYPE AND TYPEWRITER OPERATION

2 Claims, 1 Drawing Fig.

[52] U.S. Cl. .......... 197/71, 197/98, 178/17
[51] Int. Cl. .......... B41j 25/24
[50] Field of Search .......... 197/1, 16, 19, 20, 71, 72, 98, 99; 178/4.1, 17, 17.5, 74, 75, 79, 80, 81

[56] References Cited

UNITED STATES PATENTS

| | | | |
|---|---|---|---|
| 1,928,421 | 9/1933 | Griffith | 178/17 |
| 1,974,307 | 9/1934 | Griffith | 178/17 |
| 2,859,276 | 11/1958 | Saykay | 178/17 |
| 2,902,092 | 9/1959 | Hildebrandt | 197/98 UX |
| 2,972,015 | 2/1961 | Saykay | 178/17 |
| 3,273,684 | 9/1966 | Oshiba et al. | 197/16 UX |
| 3,283,873 | 11/1966 | Robinson | 197/71 |
| 3,363,737 | 1/1968 | Wada et al. | 197/98 |
| 3,412,204 | 11/1968 | Hennig et al. | 178/17 |
| 3,441,671 | 4/1969 | Hennig | 178/17 |

*Primary Examiner*—Ernest T. Wright, Jr.
*Attorney*—Camil P. Spiecens

ABSTRACT: A keyboard includes a plurality of key-operated graphic indicia (characters, symbols, numerics, etc.) switches, a Qwerty shift lock switch and a case shift switch. Normally, the keyboard transmits coded combinations of signals representing lower case characters unless the case shift switch is operated. In the "Qwerty" position, i.e. when the shift lock switch is thrown, the keyboard normally transmits upper case characters unless the case shift switch is operated. In either event, certain symbols are transmitted according to the normal operation, i.e. the "Qwerty" shift switch does not effect the normal transmission of symbols. A Qwerty field on a keyboard is that row of keys associated with the characters Q, W, E, R, T, Y, U, I, O, P. On conventional office typewriters and some Teletypewriters it is the second row of keys.

PATENTED JUN 22 1971 3,586,148
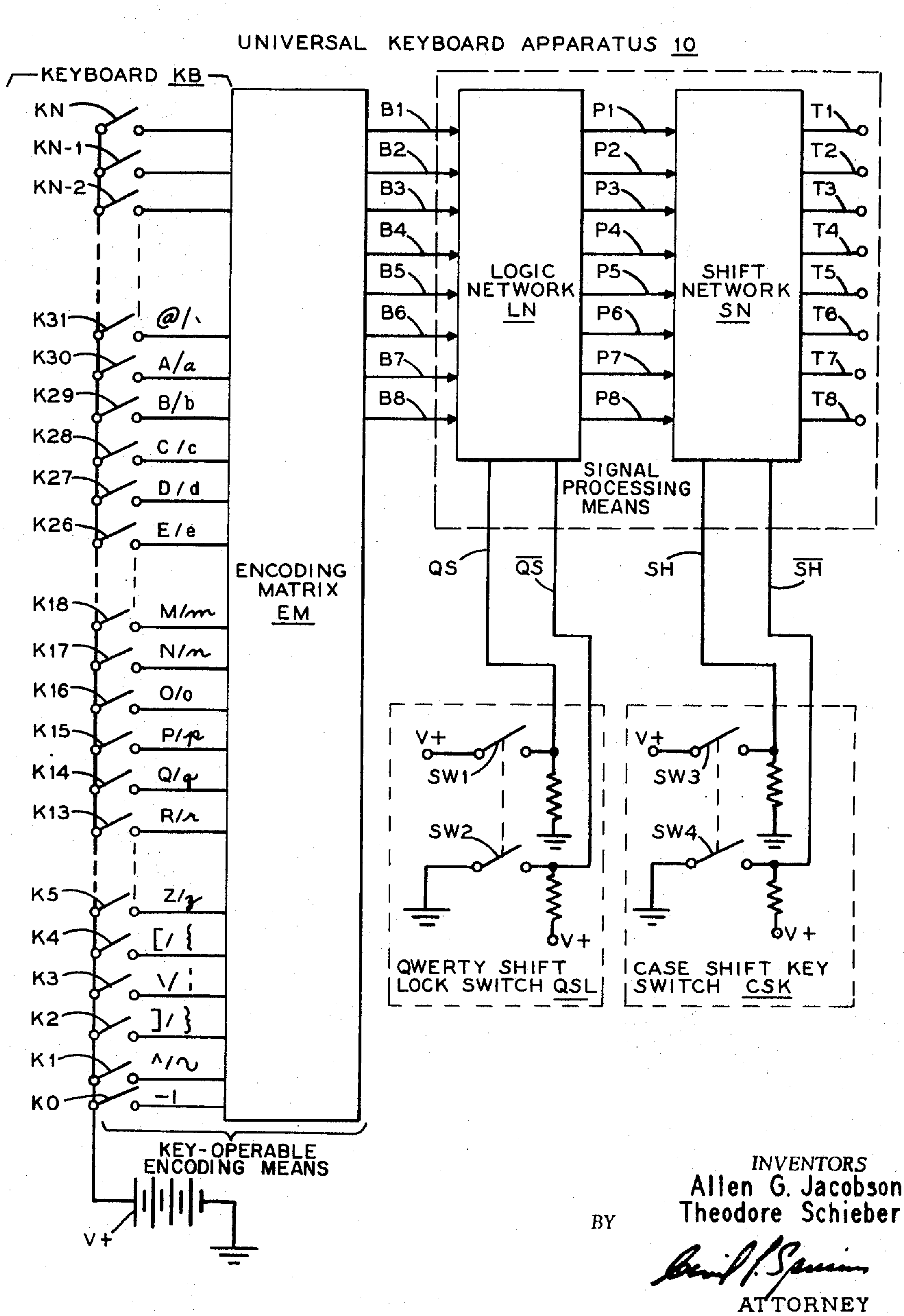
INVENTORS
Allen G. Jacobson
Theodore Schieber
BY
ATTORNEY

KEYBOARD APPARATUS SWITCHABLE BETWEEN TELETYPE AND TYPEWRITER OPERATION

This invention pertains to digital input devices and more particularly to input keyboards.

Most multiaccess computer systems require many remote operator terminals which include input keyboards. Presently, the input keyboards are part of the Teletype apparatuses or modified electric typewriters. Many operators are familiar with just one of the keyboards. In a large number of the Teletypewriters (those similar to Teletype models 33 and 35), the unshifted ("lower case") keyboard transmits upper case alphabetic characters and numerics. The shifted ("upper case") keyboard state causes transmission of control codes in response to operation of the keys associated with the Qwerty alphabetic field. On the other hand, an office typewriter keyboard and the Teletype model 37 keyboard transmit lower case alphabetic characters in the unshifted mode and upper case alphabetic characters in the shifted mode.

Thus, it may be necessary to train operators to work either type of keyboard or provide two different types of keyboards in a multiaccess computer system. Either solution is not too desirable.

It is therefore a prime object of the invention to provide keyboard apparatus for a remote terminal which appears to the operator as either a Teletypewriter or a conventional office typewriter as desired.

Briefly, the invention contemplates a keyboard apparatus for generating code combinations of signals which represent a set of graphic indicia including at east upper and lower case alphabetic characters and some symbols. The apparatus includes a plurality of key-operated graphic indicia switches each associated with a pair of graphic indicia. These switches are divided into first and second groups. The first group includes those switches associated with alphabetic characters wherein the pair of indicia associated with the switch is the upper and lower case versions of the same alphabetic character. The second group includes those switches wherein the associated pair of indicia are two different symbols. There is a key-operated shift switch means which indicates which one of the graphic indicium of each pair of graphic indicia is to be represented by the operation of the associated graphic indicia switch. A user-settable shift lock switch means can reverse the operative effect of the key-operated shift switch means. An override means, responsive to the operation of any one of the second group of graphic indicia switches prevents the user-settable shift lock switch means from reversing the operative effect of the key-operative shift switch means.

Thus, when the shift lock switch means is operated, unshifted operation results in transmission of symbols so that only the operating mode of the Qwerty alphabetic portion of the keyboard is changed.

Other objects, the features and advantages of the invention will be apparent from the following detailed description when read with the accompanying drawing whose sole FIGURE shows a schematic representation of a keyboard apparatus according to the invention.

Before describing the apparatus, the theory behind the invention will be discussed with respect to USA Standard Code for Information Interchange (USCII). This is a coded character set which is used for the general interchange of information among information processing systems, communication systems and associated equipment. The code is now being adopted by civilian users and has become mandatory for the military. Each graphic indicium (alphabetic character, numeric, symbol or function code) is represented by a seven bit binary coded word.

The portion of the code of interest for the present invention is reproduced in Table I.

A study of Table I indicates that the upper case alphabetic characters are in column 4, rows 1 to 15 and column 5, rows 0 to 10 and their lower case counterparts are in column 6 rows 1 to 15 and column 7 rows 0 to 10, respectively. The remainder of columns 4 to 7 include graphic symbols. It should also be noted that the difference in the coding of an upper and a lower

TABLE I

| | | | | | | | | | |
|---|---|---|---|---|---|---|---|---|---|
| $b_7$ | | | | | | 1 | 1 | 1 | 1 |
| $b_6$ | | | | | | 0 | 0 | 1 | 1 |
| $b_5$ | | | | | | 0 | 1 | 0 | 1 |
| Bits | $b_4$ | $b_3$ | $b_2$ | $b_1$ | column / row | 4 | 5 | 6 | 7 |
| | 0 | 0 | 0 | 0 | 0 | @ | P | ` | p |
| | 0 | 0 | 0 | 1 | 1 | A | Q | a | q |
| | 0 | 0 | 1 | 0 | 2 | B | R | b | r |
| | 0 | 0 | 1 | 1 | 3 | C | S | c | s |
| | 0 | 1 | 0 | 0 | 4 | D | T | d | t |
| | 0 | 1 | 0 | 1 | 5 | E | U | e | u |
| | 0 | 1 | 1 | 0 | 6 | F | V | f | v |
| | 0 | 1 | 1 | 1 | 7 | G | W | g | w |
| | 1 | 0 | 0 | 0 | 8 | H | X | h | x |
| | 1 | 0 | 0 | 1 | 9 | I | Y | i | y |
| | 1 | 0 | 1 | 0 | 10 | J | Z | j | z |
| | 1 | 0 | 1 | 1 | 11 | K | [ | k | { |
| | 1 | 1 | 0 | 0 | 12 | L | \ | l | ¦ |
| | 1 | 1 | 0 | 1 | 13 | M | ] | m | } |
| | 1 | 1 | 1 | 0 | 14 | N | ^ | n | ~ |
| | 1 | 1 | 1 | 1 | 15 | O | _ | o | DEL |

case alphabetic character resides only in the value of the $b_6$ bit position. For example, *A* is represented by 1000001 (reading from left to right, i.e. bit position $b_6$ is the least significant position) and *a* is represented by 1100001. For upper case character A, $b_6 = 0$ and for lower case character *a*, $b_6 = 1$. Thus, to produce a case shift, it is only necessary to reverse the binary significance (invert) of bit $b_6$. However, for the remaining symbols in the columns, a different symbol, as opposed to a shift in the case of a character, results when bit $b_6$ is inverted.

For standard case shifting, this presents no problem. But, for Qwerty alphabet case shifting to simulate a Teletypewriter keyboard this presents a problem since the significance of the symbols (as opposed to characters) in columns 4 to 7 should be preserved. This can be accomplished during a Qwerty shift by inverting bit $b_6$ only when the codes for the alphabetic characters are to be generated. Since there are more alphabetic characters than symbols under consideration, it is more economical to tentatively invert bit $b_6$ for all indicia and merely inhibit the inversion for the symbols. This is the technique employed by the keyboard apparatus shown in the sole FIGURE.

The universal keyboard apparatus 10 comprises: the keyboard KB, connected via a plurality of lines to the encoding matrix EM having output lines B1 to B8; logic network LN having inputs connected to lines B1 to B8 and output lines P1 to P8; shift network SN having inputs connected to lines P1 to P8 and output lines T1 to T8; a Qwerty shift lock switch QSL connected via lines QS and $\overline{QS}$ to logic network LN; and case shift key switch CSK connected via lines SH and $\overline{SH}$ to shift network SN. Keyboard KB and encoding matrix EM can be considered to be in combination a key-operable encoding means, and the combination of logic network LN and shift network SN can be a signal processing means.

Keyboard KB comprises a plurality of key-operated graphic indicia switches KO to KN. These switches are shown schematically as single-pole, single-throw switches (actually each switch is closed by the depression of a key on a mechanically conventional keyboard). The moving contact of each switch is connected to a voltage source V+, while the fixed contact of each switch is connected via a separate line to encoding matrix EM. Thus, whenever a switch is closed, a positive voltage signal is fed via its unique line to encoding matrix EM.

It should be noted that to the right of each switch is the graphic indicia pair associated with the switch. In particular, switches KO to K15 are associated with the graphic indicia of columns 5 and 7 of Table I; switches K16 to K31 are associated with the graphic indicia of columns 4 and 6, and switches K32 to KN are associated with graphic indicia which are of no concern to the present invention. Furthermore, encoding matrix EM can be a conventional diode matrix when it receives a signal at one of its inputs, transmits a coded combination of signals on its output lines B1 to B8. In particular, the matrix will always transmit on lines B1 to B7 the seven bit lower case code associated with the depressed switch. These lower case codes are readily apparent from Table I. In addition, the matrix will transmit a parity bit on line B8. The parity bit will be such that the coded combination of binary signals on lines B1 to B8 will have odd parity. Thus, for example, if graphic indicia switch K30 associated with the pair A/*a* is closed, matrix EM will transmit the following binary coded combination of signals on the output lines:

B1 = 1; B2 = 0; B3 = 0; B4 = 0; B5 = 0; B6 = 1; B7 = 1; and B8 = 1. For simplicity, the reference characters will be used to indicate the signal on the line. However, it should be remembered that the lines only carry binary signals which are either high (1) or low (0).

Logic network LN can be a combination of AND-circuits, OR-circuits and phase inverting amplifiers which satisfy the following Boolean logic equations:

P1 = B1 (indicating a direct connection from input to output)

$$P2 = B2$$
$$P3 = B3$$
$$P4 = B4$$
$$P5 = B5$$
$$P6 = B6 \cdot \overline{QW} + \overline{B6} \cdot QW$$
$$P7 = B7$$
$$P8 = B8 \cdot \overline{QW} + \overline{B8} \cdot QW$$
$$QW = QS \cdot \overline{(GS1 + GS2 + GS3 + GS4 + GS5)}$$
$$GS1 = B7 \cdot B6 \cdot \overline{B5} \cdot \overline{B4} \cdot \overline{B3} \cdot \overline{B2} \cdot \overline{B1} = (\grave{})$$
$$GS2 = B7 \cdot B6 \cdot B5 \cdot B4 \cdot \overline{B3} \cdot B2 \cdot B1 = (\{)$$
$$GS3 = B7 \cdot B6 \cdot B5 \cdot B4 \cdot B3 \cdot \overline{B2} \cdot B1 = (:)$$
$$GS4 = B7 \cdot B6 \cdot B5 \cdot B4 \cdot B3 \cdot \overline{B2} \cdot B1 = (\})$$
$$GS5 = B7 \cdot B6 \cdot B5 \cdot B4 \cdot B3 \cdot B2 \cdot \overline{B1} = (\sim);$$

Where the (·) operator indicates a logic AND function, the (+) operator indicates a logic OR function, and the (‾) operator indicates a logic inversion or complementing function. The AND functions can be performed by the AND circuits, the OR functions by the OR circuits and the required inversions by inverting amplifiers. The signals on lines B1 to B8 are transmitted to lines P1 to P8 according to the above-listed equations.

The QS and $\overline{QS}$ signals are obtained from Qwerty shift lock switch QSL comprising the two ganged single-pole, single-throw switches SW1 and SW2. The switch SW1 has its fixed contact connected to the line QS and via a resistor, to ground potential, and its movable contact connected to the voltage source V+. The switch SW2 has its fixed contact connected to the line $\overline{QS}$ and, via a resistor, to the voltage source V+, and its movable contact connected to ground. When switches SW1 and SW2 are simultaneously closed, a Qwerty alphabet shift mode transmission is to be performed and the Teletypewriter keyboard is to be simulated, when the switches SW1 and SW2 are open, an office typewriter keyboard is simulated.

The shift network SN can be a network of AND-circuits, OR-circuits and inverting amplifiers satisfying the following Boolean equations:

$$T1 = P1$$
$$T2 = P2$$
$$T3 = P3$$
$$T4 = P4$$
$$T5 = P5$$

$$T6 = P6 \cdot \overline{SH} + \overline{P6} \cdot SH$$
$$T7 = P7$$
$$T8 = P8 \cdot \overline{SH} + \overline{P8} \cdot SH;$$

Where the same rules and functions hold as for the logic network LN. Thus, the coded combinations of signals received on lines P1 to P8 are trasmitted from lines T1 to T8 according to the above equations.

The signals SH and SH are generated by the case shift key switch CSK comprising the ganged single-pole, single-throw switches SW3 and SW4. Switch SW3 and switch SW4 are wired in the same manner as switches SW1 and SW2 and operate in the same manner respectively, to generate the SH and SH signals.

Several examples of the operation of the keyboard 10 will be given: 1. Qwerty shift lock switch QSL is not operated. In such a case, the keyboard operates as a normal office typewriter keyboard. Assume graphic indicia key-operated switch K30 (A/a) is closed. Encoding matrix EM generates the binary coded combination of signals 01100001 on lines B1 to B8 respectively. The signals are read from right to left, where the least significant bit signal is associated with line B1, etc. Logic network LN transmits the same coded combination of signals on lines P1 to P8. If case shift key-operated switch CSK has not been depressed (closed), indicating office typewriter lower case, the same coded combination of signals is transmitted from lines T1 to T8, respectively, i.e. 01100001 = *a*. If the case shift key-operated switch CSK had been depressed, calling for upper case, the signal on line P6 = 1 and the signal on line B8 = 0 would be inverted in shift network SN so that the signal on line T6 = 0 and on line T8 = 1 and the coded combination transmitted becomes 11000001 = *A*.

2. Qwerty shift lock switch QSL is operated. Keyboard 10 simulates a Teletypewriter keyboard. Again, assume switch K28 is closed. Encoding matrix EM again transmits the binary coded combination of signals 01100001 which enter logic network LN via the lines B1 to B8. The signals on lines B6 and B8 are inverted and transferred to lines P6 and P8 as 0 and 1, respectively, so that the binary coded combination of signals or lines P1 to P8 is 11000001 = A. If case shift switch CSK is not operated, then the lines T1 to T8 transmit the binary coded combination of signals 11000001 = A. If, however, case shift switch CSK is operated, shift network SN inverts the signals on lines P6 and P8, 0 and 1, respectively, to 1 and 0, and transfers the inverted signals to lines T6 and T8 respectively. Thus shift network SN transfers to lines T1 to T8 the binary coded combination of signals 01100001 = *a*.

3. If graphic indicia switch K1 is closed, then encoding matrix EM transmits onto lines B1 to B8 the binary coded combination of signals 11111110. Now, regardless of the position of the Qwerty shift lock switch QSL, logic network LN will transmit to lines P1 to P8 the same binary coded combination of signals 11111110. Shift network SN will invert P6 and P8 in the usual manner in accordance with the operation of case shift switch CSK. In other words, Qwerty shift lock switch QSL has no effect on the symbols, only the case shift switch CSK has an effect.

Thus, an improved keyboard apparatus has been shown which, by adding a Qwerty shift lock switch, permits the keyboard apparatus to simulate a Teletypewriter or an office typewriter keyboard.

While the apparatus was explained using positive logic and voltages, other logic and voltages are equally applicable. Similarly, while the apparatus used odd parity, it should be realized that even parity could also be employed.

While it is highly desirable to include a parity bit in the codes to improve reliability, such a bit can be deleted.

It should also be realized that the case shift function can be performed in the encoding matrix. However, the equipment is simplified by performing the case shift function after the Qwerty alphabetic shift function.

What we claim: is:

1. A keyboard apparatus for generating coded combinations of signals representing a set of graphic indicia including at least upper case alphabetic characters, lower case alphabetic characters and a plurality of symbols, each graphic indicium being represented by a unique binary coded combination of signals T1, T2, T3, T4, T5, T6 and T7, said apparatus comprising: a key-operable signal encoding means including a plurality of graphic indicia switches each associated with a pair of indicia wherein each one of the switches of a first group of said switches is associated with the upper and lower case representations of the same one of the alphabetic characters, respectively, and each one of the switches of a second group of said switches is associated with two different symbols, each one of said switches when operated generating a different binary coded combination of signals B1, B2, B3, B4, B5, B6 and B7, each having a particular positional significance; a user-operable shift lock switch for generating a control signal QS for indicating which graphic indicium of a pair of graphic indicia is to be represented as a binary coded combination of signals; a key-operable case shift switch for generating a control signal SH for indicating a case shift; and a signal processing means connected to said key-operable signal encoding means, said user-operable shift lock switch and said key-operable case shift switch for receiving signals therefrom and generating binary coded combinations of signals T1, T2, T3, T4, T5, T6 and T7, each having a particular positional significance, said signal processing means including logical elements for processing the received signals in accordance with the following Boolean logic equations:

$$T1=P1;\ T2=P2;\ T3=P3;\ T4=P4;\ T5=P5;\ T7=P7;$$
$$T6=(P6\cdot\overline{SH})+(\overline{P6}\cdot SH);\ P6=(B6\cdot\overline{QW})+(\overline{B6}\cdot QW);$$
$$QW=QS\cdot\overline{(GS1+GS2+GS3+GS4+GS5)};$$
$$GS1=B7\cdot B6\cdot\overline{B5}\cdot\overline{B4}\cdot\overline{B3}\cdot\overline{B2}\cdot\overline{B1};$$
$$GS2=B7\cdot B6\cdot B5\cdot B4\cdot\overline{B3}\cdot B2\cdot B1;$$
$$GS3=B7\cdot B6\cdot B5\cdot B4\cdot B3\cdot\overline{B2}\cdot\overline{B1};$$
$$GS4=B7\cdot B6\cdot B5\cdot B4\cdot B3\cdot\overline{B2}\cdot B1;\ \text{and}$$
$$GS5=B7\cdot B6\cdot B5\cdot B4\cdot B3\cdot B2\cdot\overline{B1};$$

2. A keyboard apparatus for generating coded combinations of signals representing a set of graphic indicia including at least upper case alphabetic characters, lower case alphabetic characters and a plurality of symbols, each graphic indicium being represented by a unique binary coded combination of signals T1, T2, T3, T4, T5, T6, T7 and T8, each having a particular positional significance, said apparatus comprising: a plurality of key-operable graphic indicia switches each associated with a pair of indicia wherein each one of the switches of a first group of said switches is associated with the upper and lower case representations of the same one of the alphabetic characters, respectively, and each one of the switches of a second group of said switches is associated with two different symbols, each one of said switches generating a different indicium signal when operated; an encoding matrix receiving the indicium signals generated by said graphic indicia switches for generating a unique binary coded combination of signals B1, B2, B3, B4, B5, B6, B7 and B8, each having a particular positional significance, in accordance with the indicia signal received; a user-operable Qwerty shift lock switch for generating a control signal QS for indicating which graphic indicium of a pair of graphic indicia is to be represented as a binary-coded combination of signals; a logic network means connected to said encoding matrix and said user-operable Qwerty shift lock switch and including logical elements for processing received signals and generating signals P1, P2, P3, P4, P5, P6, P7 and P8, each having a particular positional significance, in accordance with the following Boolean logic equations:

$$P1=B1;\ P2=B2;\ P3=B3;\ P4=B4;\ P5=B5;$$
$$P6=(B6\cdot\overline{QW})+(\overline{B6}\cdot QW);\quad P7=B7;\quad P8=(B8\cdot\overline{QW})+(\overline{B8}\cdot QW);$$
$$QW=QS\cdot\overline{(GS1+GS2+GS3+GS4+GS5)};$$
$$GS1=B7\cdot B6\cdot\overline{B5}\cdot\overline{B4}\cdot\overline{B3}\cdot\overline{B2}\cdot\overline{B1};$$
$$GS2=B7\cdot B6\cdot B5\cdot B4\cdot\overline{B3}\cdot B2\cdot B1;$$
$$GS3=B7\cdot B6\cdot B5\cdot B4\cdot B3\cdot\overline{B2}\cdot\overline{B1};$$
$$GS4=B7\cdot B6\cdot B5\cdot B4\cdot B3\cdot\overline{B2}\cdot B1;\ \text{and}$$
$$GS5=B7\cdot B6\cdot B5\cdot B4\cdot B3\cdot B2\cdot\overline{B1};$$

a key-operable case shift switch for generating a control signal SH; and a shift network means connected to said logic network means and said case shift switch for processing received signals and generating signals T1, T2, T3, T4, T5, T6, T7 and T8, each having a particular positional significance, in accordance with the following Boolean logic equation: $T1 = T2 = P2$; $T3 = P3$; $T4 = P4$; $T5 = P5$; $T6 = (P6^{\overline{SH}}) + (\overline{P6}^{SH})$; $T7 = P7$; and $T8 = (P8^{\overline{SH}}) + (\overline{P8}^{SH})$.